INVENTORS
MARTIN HUIZINGA
LEE C. VERDUIN
JAMES R. KUIPER

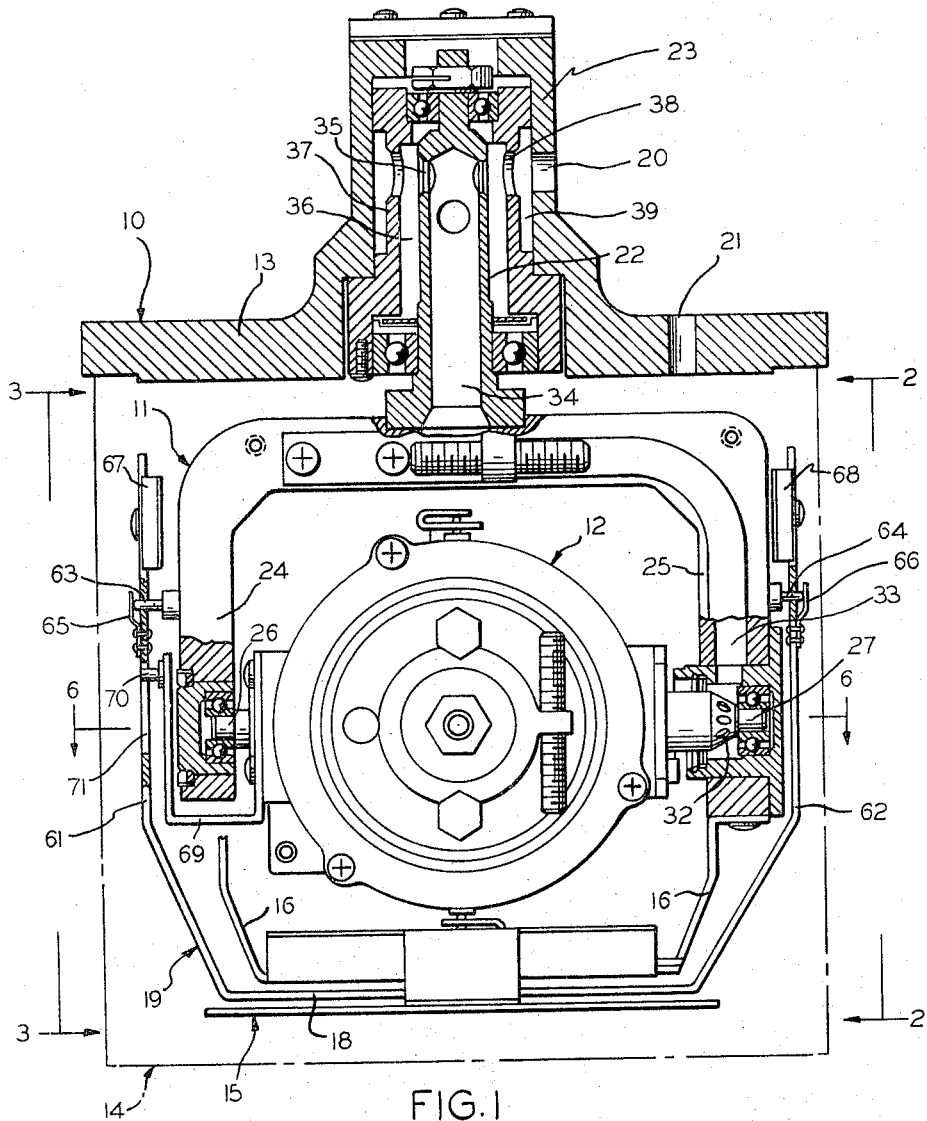

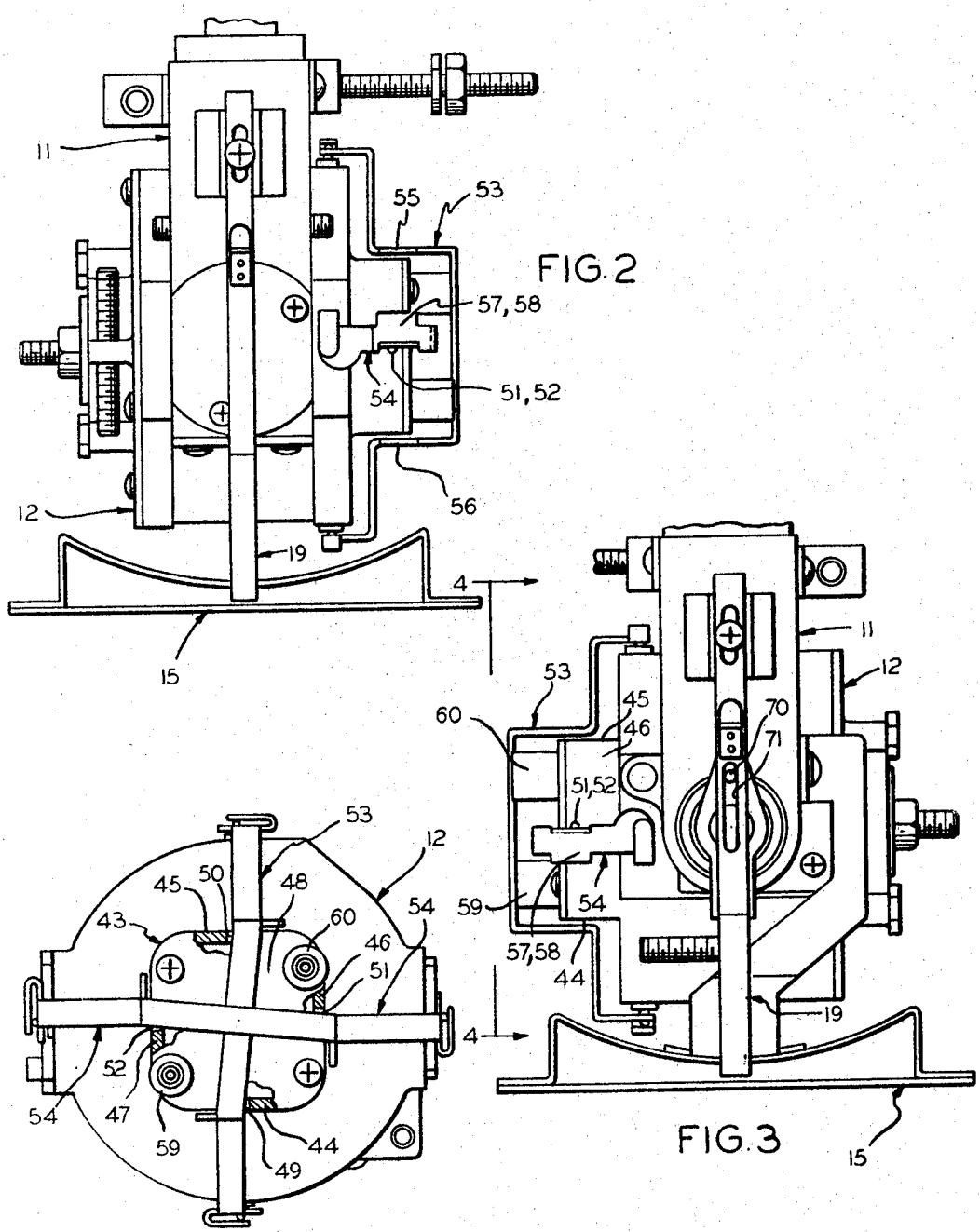

BY *Marzall, Johnston, Cook + Root*
ATTORNEYS

3,310,987
PNEUMATIC GYRO
Martin Huizinga, Wyoming, and Lee C. Verduin and
  James R. Kuiper, Grand Rapids, Mich., assignors to
  R. C. Allen Business Machines, Inc., Grand Rapids,
  Mich., a corporation of Michigan
        Filed Sept. 14, 1964, Ser. No. 396,304
                12 Claims. (Cl. 74—5.43)

This invention relates in general to a pneumatic gyro for use in determining the attitude of aircraft, and more particularly to a pneumatic gyro having gravitationally responsive means for maintaining the spin axis of the rotor in erect position.

Heretofore, pneumatic gyros of the type concerned with in this invention have been constructed for limited use in that they were not capable of handling anything but standard aircraft maneuvers without losing control, and even then, precession errors were encountered which endangered the flight of the aircraft.

More particularly, heretofore developed pneumatic gyros having gravitationally responsive means for maintaining the rotor spin axis erect and including erection vanes, have employed metal stops for preventing undue movement of the vanes. However, these metal stops or stop pins, when engaged by the vanes, transmit vibration from the airplane frame to the erection vanes resulting in the loss of erection control and malfunctioning of the instrument.

Therefore, it is an object of this invention to obviate the above difficulties and to provide a pneumatic gyro having means to prevent vibration of the vanes during all conditions of use.

Another object of this invention is in the provision of a pneumatic gyro having gravitationally responsive means for maintaining the rotor spin axis erect including erection vanes, and having pliable or resilient stops that when engaged by the vanes will absorb vibration forces emanating from the airplane frame and eliminate any vibration of the vanes that would cause losing control of the gyro.

Still another object of this invention resides in the provision of a pneumatic gyro having erection vane stops of resilient energy absorbing material.

Pneumatic gyros heretofore developed also encountered precession errors because the erection vanes were provided for limited movement, wherein permitting a vane to rest against a stop during normal maneuvers of an aircraft would inject precession error into the reading by the operator. For when a vane is permitted to rest against a stop, the effective weight of the vane shifts from its pivot points thereby causing unbalance of the gimbal, which in turn produces a precession error.

Therefore, a further feature of the present invention is to provide a pneumatic gyro having means gravitationally responsive to maintain the rotor spin axis erect, and which obviates the above difficulties and provides erection vanes freely suspended at their pivot points with angles of freedom on each side of center exceeding those experienced due to horizontal accelerations encountered during normal maneuvers of aircraft, thereby eliminating a source of precession error in the instrument.

A still further object of this invention is to provide a pneumatic gyro having erection vanes with angles of freedom on each side of center exceeding those experienced due to horizontal accelerations during normal maneuvering of aircraft.

Other objects, features and advantages of the invention will be apparent from the following detailed disclosure, taken in conjunction with the accompanying sheets of drawings, wherein like reference numerals refer to like parts, in which:

FIG. 1 is a plan view with some parts broken away and others in section of a pneumatic gyro in accordance with the invention, wherein the gyro casing is removed but illustrated in dot-dash lines;

FIG. 2 is a slightly reduced side elevational view of the gyro of FIG. 1 and taken substantially along line 2—2 of FIG. 1;

FIG. 3 is a slightly reduced side elevational view of the gyro of FIG. 1 and taken substantially along line 3—3 of FIG. 1;

FIG. 4 is a bottom plan view of a rotor housing illustrating the normal position of the erection vanes and the association with the pliable stops, and taken substantially along line 4—4 of FIG. 3;

Figure 5:
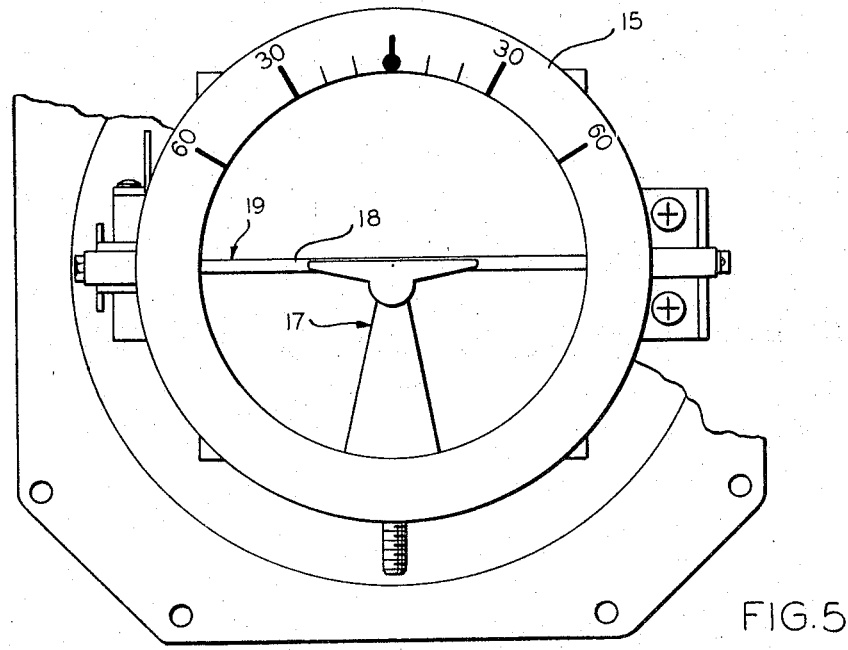
FIG. 5 is a front elevational view of the pneumatic gyro of FIG. 1 with some parts broken away for purposes of clarity.
Figure 6:
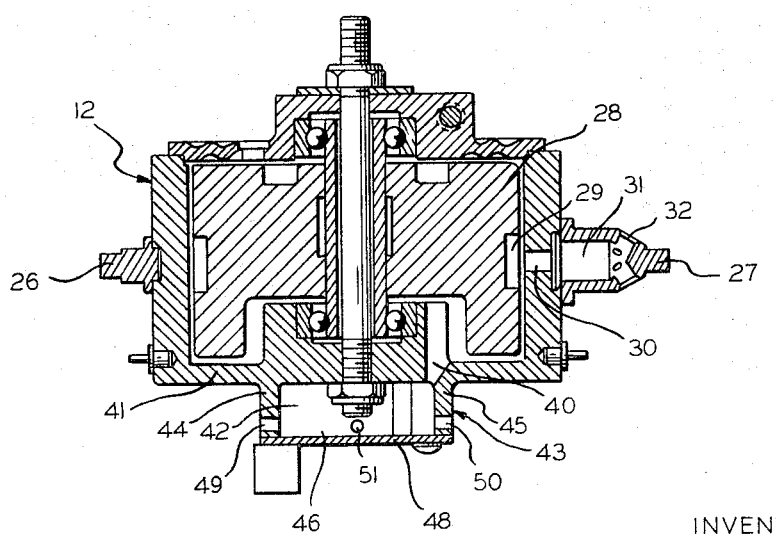
FIG. 6 is an axial sectional view taken through the rotor and rotor housing and substantially along line 6—6 of FIG. 1.

The pneumatic gyro of the present invention is illustrated in an embodiment wherein the gyro has two degrees of freedom, and is commonly referred to in the industry as a horizon gyro or roll and pitch indicator. This gyro is capable of indicating to the aircraft within which it is installed the amount of roll and pitch of any maneuvers relative to the horizon. The invention particularly relates to improvements in the gravitationally responsive means employed for maintaining the rotor spin axis erect. It should be appreciated that the invention could likewise be employed in a gyro of a type for use in aircraft that is commonly referred to as a directional gyro or yaw indicator. However, it is not believed necessary to specifically illustrate both gyros in this application in setting forth the invention. A person skilled in the art, after study of the present disclosure, can readily and easily see the application of the invention to a directional gyro.

Referring now to the drawings, and particularly to FIG. 1, the embodiment illustrated includes a frame 10 having a gimbal fork 11 pivotally mounted thereon, and in turn, pivotally carrying a rotor housing 12. The frame 10 defines a rear wall 13 for the gyro, and a casing 14 indicated in dot-dash lines for simplicity is employed to coact with the rear wall 13 to completely enclose the gyro mechanism in an airtight housing.

A dial 15 is suitably supported by brackets 16 to the gimbal fork 11 and marked with indicia to indicate the roll condition of the aircraft. A suitable horizon guide 17 coacts with the dial 15 and an indicating portion 18 of a horizon bar 19 to denote the pitch condition of the aircraft. The horizon bar 19 is responsive to the rotor housing position 12.

The pneumatic gyro of the present invention may be driven by compressed air or a vacuum. An air inlet 20 and an air outlet 21, FIG. 1, may be appropriately connected with a suitable air supply for powering the gyro. If compressed air is employed, the supply would be connected to the air inlet 20 and air within the casing 14 would be exhausted through the air outlet 21. The air outlet 21 would be employed if the gyro were to be powered by a vacuum, wherein a vacuum line would be suitably connected to the air outlet 21, and the port 20 would merely serve as an air inlet.

The gimbal fork 11 is secured to and cantileverly mounted on a stub shaft 22 that is bearingly mounted in the hub 23 of the frame 10. The rotor housing 12 is bearingly mounted between the arms 24 and 25 of the gimbal fork 11 along a horizontal axis that is perpendicular to the horizontal axis of the stub shaft 22. The horizontal axis of the shaft 22 constitutes the roll axis of the gyro, while the horizontal axis of the rotor housing 12 constitutes the pitch axis of the gyro. Thus, the gimbal fork 11 is pivotally mounted to the frame 10 for movement about a first horizontal axis, while the rotor housing 12 is pivotally mounted to the gimbal fork 11 for movement about a second horizontal axis extending normal to the first horizontal axis.

The rotor housing 12 is provided with diametrically opposed trunnions 26 and 27 that are bearingly mounted in the arms 24 and 25 of the gimbal fork 11. While the gyro housing 12 is shown in detail, it is not considered part of the invention except where relating to the gravitationally repsonsive means for maintaining the housing in erect position. A rotor 28 is rotatably mounted within the rotor housing which is air-sealed, and includes annular buckets 29 having impinging thereon a jet stream of air emitted from the port 30 for driving the rotor.

Air is supplied to the port 30 through a passage 31 in the trunnion 27 having a plurality of openings 32 that communicate with a passageway 33, FIG. 1, that extends through the gimbal fork 11 at one side thereof. This passageway in turn communicates with a bore 34 arranged in the stub shaft 22. A plurality of annularly arranged openings 35 are provided in the shaft 22 that lead to an annular chamber 36 surrounding the shaft. A bushing 37 is arranged within the hub 23 and in surrounding relation to the shaft 22 to coact therewith and define the annular chamber 36. A plurality of radially arranged openings 38 are provided in the bushing 37 intercommunicating with an annular chamber 39 and the air inlet 20. Thus, air entering the inlet 20 serves to drive the rotor 28.

After the air within the rotor housing is spent having acted on the buckets 29, it is exhausted through an opening 40 arranged in the lower wall 41 and into a plenum chamber 42 that is defined by a substantially square housing 43 having parallel opposed side walls 44 and 45 and parallel opposed side walls 46 and 47 extending at right angles to the walls 44 and 45. A bottom wall 48 is in parallel opposed relation to the lower wall 41 of the rotor housing.

A pair of aligned air exhaust and erection ports 49 and 50 are provided in the side walls 44 and 45, respectively, while a pair of aligned and opposed air exhaust and erection ports 51 and 52 are provided respectively in the opposed side walls 46 and 47. The housing 43 is perfectly centered with respect to the spin axis of the rotor 28 so that a line extending through the center of the ports 49 and 50 intersects at right angles a line at the center of the ports 51 and 52 and the intersection is aligned with the rotor spin axis. Therefore erection jets issuing from the ports 49, 50, 51 and 52 are arranged in symmetry relative to the rotor spin axis. Moreover, the axes of the ports extend perpendicular to the spin axis.

A generally U-shaped erection vane 53 coacts with the erection jets issuing from the ports 49 and 50, while an erection vane 54 coacts with the erection jets issuing from the ports 51 and 52. The erection vane 53, swinging about an axis parallel to the line of flight of the aircraft, constitutes the roll erection vane, while the erection vane 54, swinging about an axis perpendicular to the swing axis of the vane 53, constitutes the pitch erection vane. The erection vane 53 includes tabs 55 and 56 coacting with the erection jets issuing from the ports 49 and 50 for applying the necessary torquing forces to the rotor housing 12 to maintain the spin axis erect along the roll axis of the instrument, while tabs 57 and 58 are provided on the pitch erection vane 54 to coact with the erection jets issuing from the ports 51 and 52 for maintaining the spin axis erect along the pitch axis of the instrument. Both erection vanes are pivotally mounted on the rotor housing to be suspended therefrom and responsive to gravitational and acceleration forces imparted to the aircraft. As noted particularly in FIG. 4, the tabs of the erection vanes are staggered so that when the erection vanes are sensing a horizontal position of the rotor housing 12, only half of each of the ports is uncovered, and the halves of each pair of ports that are uncovered are opposite. This produces a null condition or no movement condition wherein the erection jets cancel each other so that the rotor housing has no resultant torque applied thereto to cause it to move in any direction. The tabs of the erector vanes are sized to insure closing of the ports through a larger arcuate movement of the vanes. More particularly, during the swinging in one direction of an erection vane wherein one port is completely uncovered, the size of the tab is such as to maintain the other port covered through a wider arcuate movement of the vane in order to concentrate the proper torquing force on the rotor housing for better and faster erection of the spin axis.

In order to limit the arcuate swing of the erector vanes 53 and 54, a pair of stops 59 and 60 are provided and mounted on the bottom 48 of the housing 43. While these stops are illustrated as being cylindrical in shape, it should be appreciated that they may take any desired shape. The stop 59 serves to limit the arcuate swing in one direction of each of the erector vanes, while the stop 60 serves to limit the arcuate swing in the other direction of each of the vanes. In order to eliminate vibration in the erector vanes should they engage a stop, the stops are constructed of energy absorbing pliable or resilient material such as foam plastic or rubber or the like. Thus, the stops 59 and 60 are capable of absorbing vibration forces when engaged thereby to prevent vibration of the erector vanes and the possibility of losing control of the instrument. These vibration forces originate in the frame of the airplane, and are transmitted through the gyro and to the vanes if metal stops are employed. The energy absorbing stops of the present invention prevent transmission to the vanes. If the vanes vibrate, they lose control of the air jets, and thereby cause the gimbals to drift from gravity orientation. For once control is lost, the instrument is of no use.

Another most important feature of the invention relates to the construction and mounting of the erector vanes so that they may encounter wide arcuate swing. This allows the vanes to be suspended freely at their pivot points with normal horizontal accelerations encountered during the normal maneuvers of the aircraft. As long as the erector vanes are freely suspended, their weight is effectively concentrated at their respective pivot points, thereby maintaining the delicate balance of the gimbals. When an erector vane is permitted to rest against a stop, the effective weight of the vane is shifted from the pivot points thereby disturbing the balance of the gimbals which in turn produces a precession error. The roll erector vane 53 can produce a pitch error and the pitch erector vane can produce a roll error. More particularly, the roll erector vane 53 is constructed to have an angle of freedom at each side of the center position exceeding the normal bank angles of the aircraft for which the gyro is fitted. In this instance, the bank angle of the aircraft and the angle of swing of the roll erector vane is the same in a coordinated turn.

For example, if the gyro is to be fitted in an aircraft having an average speed of one hundred and twenty-five miles per hour during approach maneuvers, the roll erection vane would be constructed to swing free plus or minus twenty degrees. It can be shown that the ideal bank angle during a standard two minute turn is computed by the following formula Bank angle = arctan .00238 $TAS$ ($TAS$ = true air speed in miles per hour).

Thus, where the true air speed equals one hundred and twenty-five miles per hour, the bank angle would be seventeen degrees, and inasmuch as the instrument would be designed so that the roll erection vane was free to swing plus or minus twenty degrees, the instrument could be capable of handling a true air speed of one hundred and fifty-three miles per hour during a standard two minute turn without being subjected to precession error. It should be appreciated that the construction of the roll erector vanes is thus capable of being designed in accordance with the maximum air speed intended to be encountered by the aircraft and so that it can swing through an arcuate path such that would exceed the normal bank angles encountered by the aircraft.

Similarly, the construction of the pitch erection vane 54 is such that normal fore and aft acceleration of the aircraft will not cause the vane to rest against the stops, thereby eliminating any possible precession error. Accordingly, the gimbal will always be in balance as long as the vanes do not hit the stops and no precession error will be encountered by the gyro.

Referring now to FIGS. 1, 2 and 3, arms 61 and 62 extend from the indicating portion 18 of the horizon bar 19 and about the outer sides of the gimbal fork arms 24 and 25. Holes are provided in the arms 61 and 62 so that they may be pivotally received on pintles 63 and 64 that are carried by the gimbal fork arms 24 and 25. Flat springs 65 and 66 are respectively mounted on the arms 61 and 62 to engage over the free ends of the pintles 63 and 64 and hold the horizon bar against lateral movement along the pintles. The horizon bar is provided with counterbalancing weights 67 and 68 behind the pivot points. The horizon bar 19 is coupled to the rotor housing 12 by means of a U-shaped bracket 69 that is secured at one end to the rotor housing and provided with a pin 70 at the other end slidably engaging in a slot 71 formed in the arm 61 of the horizon bar 19. Thus, pitch angles are noted by the indicator bar 18 which is moved up or down from the horizon guide 17 by relative movement between the rotor housing 12 and the gimbal fork 11. Roll or bank angles are noted on the dial 15 by relative movement between the gimbal fork 11 and the frame 10.

It will be understood that modifications and variations may be effected without departing from the scope of the novel concepts of the present invention, but it is understood that this application is to be limited only by the scope of the appended claims.

The invention is hereby claimed as follows:

1. In a pneumatic gyro for aircraft having an air driven rotor rotatable in a pivotally mounted rotor housing, an air inlet for said housing, and gravitationally responsive means for maintaining the spin axis of said rotor erect, said means including at least one pair of horizontally aligned and spaced air exhaust and erection ports on said rotor housing, erection jets issuing from said ports to exert erecting torques on said rotor housing, an erector vane pendulously mounted on said rotor housing and having tabs coacting with said erector jets to control said erecting torques in accordance with the attitude of the gyro, and resilient stops mounted on said rotor housing capable of absorbing vibration forces at opposite extreme positions of the vanes and thereby eliminate vibration of said vanes.

2. In a pneumatic gyro for aircraft having an air driven rotor rotatable in a pivotally mounted rotor housing, an air inlet for said housing, and gravitationally responsive means for maintaining the spin axis of said rotor erect, said means including at least one pair of horizontally aligned and spaced air exhaust and erection ports on said rotor housing, erection jets issuing from said ports to exert erecting torques on said rotor housing, an erector vane pendulously mounted on said rotor housing and having tabs coacting with said erector jets to control said erecting torques in accordance with the attitude of the gyro, stops mounted on said rotor housing for limiting movement of said vane between extreme positions, said vane being generally U-shaped and mounted on said rotor housing to have an angle of freedom each side of center between said stops exceeding the angles caused by horizontal accelerations experienced during normal maneuvering of the aircraft.

3. In a pneumatic gyro for aircraft having an air driven rotor rotatable in a pivotally mounted rotor housing, an air inlet for said housing, and gravitationally responsive means for maintaining the spin axis of said rotor erect, said means including at least one pair of horizontally aligned and spaced air exhaust and erection ports on said rotor housing, erection jets issuing from said ports to exert erecting torques on said rotor housing, an erector vane pendulously mounted on said rotor housing and having tabs coacting with said erector jets to control said erecting torques in accordance with the attitude of the gyro, and resilient stops mounted on said rotor housing capable of absorbing vibration forces at opposite extreme positions of the vanes and thereby eliminate vibration thereof, said vane being generally U-shaped and mounted on said rotor housing to have an angle of freedom each side of center between said stops exceeding the angles caused by horizontal accelerations experienced during normal maneuvering of the aircraft.

4. In a pneumatic gyro for aircraft, a rotor housing having a rotor rotationally mounted therein, an air inlet, a pair of opposed air exhaust and erection ports and a pendulously mounted erector vane coacting with erection jets issuing from said ports to apply torques to said rotor housing to maintain the spin axis of the rotor erect, the improvement being in having resilient stops mounted on said housing for limiting the extreme swinging movements of said vane and to absorb vibration forces and thereby eliminate vibration of the vane.

5. In a pneumatic gyro for aircraft, a rotor housing having a rotor rotationally mounted therein, an air inlet, a pair of opposed air exhaust and erection ports and a pendulously mounted erector vane coacting with erection jets issuing from said ports to apply torques to said rotor housing to maintain the spin axis of the rotor erect, the improvement being in dimensioning and mounting said vane so that it is capable of freely swinging through an arcuate path exceeding the angles caused by horizontal accelerations experienced during normal maneuvering of the aircraft.

6. In a pneumatic gyro for aircraft, a rotor housing having a rotor rotationally mounted therein, an air inlet, a pair of opposed air exhaust and erection ports and a pendulously mounted erector vane coacting with erection jets issuing from said ports to apply torques to said rotor housing to maintain the spin axis of the rotor erect, the improvement being in providing stops on said housing for limiting the extreme swing positions of said vane in such spaced relation that the vane is capable of freely swinging through angles opposite of center exceeding the angles caused by horizontal accelerations experienced during normal maneuvering of the aircraft.

7. In a pneumatic gyro for aircraft, a rotor housing having a rotor rotationally mounted therein with a normally erect spin axis, an air inlet, a plurality of pairs of opposed air exhaust and erection ports, and a pendulously mounted erector vane for each pair of ports coacting with erection jets issuing therefrom to apply torques to said rotor housing to maintain the spin axis of the rotor erect, the improvement being in having resilient stops of energy absorbing material mounted on said rotor housing for limiting the extreme swing positions of said vanes and to absorb vibration forces and thereby eliminate vibration of the vanes and loss of control of the gyro.

8. In a pneumatic gyro for aircraft, a rotor housing having a rotor rotationally mounted therein with a normally erect spin axis, an air inlet, a plurality of pairs of opposed air exhaust and erection ports, and a pendulously mounted erector vane for each pair of ports coacting with erection jets issuing therefrom to apply torques to said rotor housing to maintain the spin axis of the rotor erect, the improvement being in dimensioning and mounting said vane so that it is capable of freely swinging through an arcuate path exceeding the angles caused by horizontal accelerations experienced during normal maneuvering of the aircraft.

9. In a pneumatic gyro for aircraft, a rotor housing having a rotor rotationally mounted therein with a normally erect spin axis, an air inlet, a plurality of pairs of opposed air exhaust and erection ports, and a pendulously mounted erector vane for each pair of ports coacting with erection jets issuing therefrom to apply torques to said rotor housing to maintain the spin axis of the rotor erect, the improvement being in providing stops on said housing for limiting the extreme swing positions of said vane in such spaced relation that the vane is capable of freely swinging through angles opposite of center exceeding the angles caused by horizontal accelerations experienced during normal maneuvering of the aircraft.

10. A pneumatic gyro for aircraft comprising, a frame, a gimbal pivotally mounted on said frame for movement about a first horizontal axis, a rotor housing having an air inlet and being pivotally mounted on said gimbal for movement about a second horizontal axis perpendicular to said first axis, a rotor rotatably mounted in said rotor housing for rotation about a normally vertical spin axis extending perpendicular to said second horizontal axis, and gravitationally responsive means for maintaining said spin axis erect including said rotor housing having a plurality of pairs of opposed air exhaust and erection ports normally horizontally positioned and emitting erection jets to exert erecting torques on said rotor housing about either of said horizontal axes, a plurality of erector vanes pendulously mounted on said rotor housing and having tabs coacting with said erector jets to control said erecting torques, and resilient stops mounted on said rotor housing capable of absorbing vibration forces at opposite extreme positions of the vanes and thereby eliminate the vibration thereof.

11. A pneumatic gyro for aircraft comprising, a frame, a gimbal pivotally mounted on said frame for movement about a first horizontal axis, a rotor housing having an air inlet and being pivotally mounted on said gimbal for movement about a second horizontal axis perpendicular to said first axis, a rotor rotatably mounted in said rotor housing for rotation about a normally vertical spin axis extending perpendicular to said second horizontal axis, and gravitationally responsive means for maintaining said spin axis erect including said rotor housing having a plurality of pairs of opposed air exhaust and erection ports normally horizontally positioned and emitting erection jets to exert erecting torques on said rotor housing about either of said horizontal axes, a plurality of erector vanes pendulously mounted on said rotor housing and having tabs coacting with said erector jets to control said erecting torques, stops mounted on said rotor housing for limiting movement of said vanes between extreme positions, said vanes being generally U-shaped and dimensioned to have an angle of freedom each side of center between said stops exceeding the angles caused by horizontal accelerations experienced during normal maneuvering of the aircraft.

12. A pneumatic gyro for aircraft comprising, a frame, a gimbal pivotally mounted on said frame for movement about a first horizontal axis, a rotor housing having an air inlet and being pivotally mounted on said gimbal for movement about a second horizontal axis perpendicular to said first axis, a rotor rotatably mounted in said rotor housing for rotation about a normally vertical spin axis extending perpendicular to said second horizontal axis, and gravitationally responsive means for maintaining said spin axis erect including said rotor housing having a first pair of opposed air exhaust and erection ports having their axes aligned and extending perpendicular to said spin axis and parallel to said first axis and a second pair of opposed air exhaust and erection ports having their axes aligned and extending perpendicular to said spin axis and parallel to said second axis, said first pair of ports issuing erection jets to exert erecting torques about the second axis and said second pair of ports issuing erection jets to exert erecting torques about the first axis, a first erector vane pendulously mounted on said housing and having tabs coacting with said erector jets issuing from said first pair of ports to control the erecting torques about the second axis and a second erector vane pendulously mounted on said housing and having tabs coacting with said erector jets issuing from said second pair of ports to control the erecting torques about the first axis, a pair of resilient spaced stops of energy absorbing material on said rotor housing limiting the swinging movement of said vanes between extreme positions, and said stops being spaced and said vanes being mounted so that they have an angle of free swing on each side of center between the stops exceeding the angles caused by horizontal accelerations experienced during normal maneuvering of the aircraft.

No references cited.

FRED C. MATTERN, JR., *Primary Examiner.*

J. D. PUFFER, *Assistant Examiner.*